J. D. BILLINGS & M. A. DECKER.
HORSESHOE.

No. 187,699.  Patented Feb. 27, 1877.

Witnesses.
P. L. VanderNiu
George B. Goodale

Inventor.
John D. Billings
Marcus A. Decker

UNITED STATES PATENT OFFICE.

JOHN D. BILLINGS AND MARCUS A. DECKER, OF NEW YORK, N. Y.

IMPROVEMENT IN HORSESHOES.

Specification forming part of Letters Patent No. 187,699, dated February 27, 1877; application filed May 19, 1876.

*To all whom it may concern:*

Be it known that we, JOHN D. BILLINGS and MARCUS A. DECKER, both of the city and county of New York, have invented a new and useful Improvement in Horseshoes, of which the following is a specification:

The object of our invention is to produce an improved horseshoe, of which the following is a description of the same.

This horseshoe is made of a convex form, the lower portion of which is of a wedged shape, tapering downwardly, having a level top, the outer edge of which is provided with a rim or bead extending upwardly.

Figure 1:
Figure 2:
Figure 3:
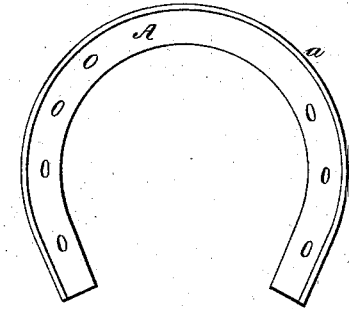

In the accompanying drawing, Figure 1 is a cross-section of our improved shoe. Fig. 2 is a transverse section of a finished shoe, and Fig. 3 is a top view of the same.

A designates our improved horseshoe. It may be made of iron, steel, or other suitable metal, and is of a convex form. The lower portion, or that which, when in use, comes in contact with the ground, is of a wedged shape, tapering downwardly, as may be seen in Fig. 1, which represents a cross-section of the same. This shoe has a level top of, say, one inch wide, provided with a rim or bead, a, on its outer edge, running upwardly, preferably extending entirely around the shoe, as shown in Fig. 3. The shoe is provided with the usual nail-holes, and when nailed to the horse's hoof the rim or bead a on the outer edge of the shoe keeps it in its place, and prevents the hoof from spreading or growing over the shoe. The shoe, thus held in position by the rim a, springs or expands across the open ends of the frog of the hoof at each step the horse takes to meet the corresponding spring of the hoof, thereby preventing the shoe from becoming loose and the horse from sustaining the injury incident to the unyielding character of shoes as commonly made.

The shoe, being of a convex form and of wedged shape on the lower surface, forms an endless calk, which, owing to its peculiar shape, is self-sharpening, and becomes sharper and sharper as it wears away.

The shoe, having a flat or level top, provided with a rim, a, may, while cold, be securely applied to a horse's foot, thus obviating the necessity of fitting the shoe by heating it and burning it into position on the hoof, which often softens and injures the hoof, causing serious lameness.

For the process of manufacture of our improved horseshoe, which is novel, we make no claim in this application, having reserved the process of manufacturing as the subject of another patent.

What we claim as our invention, and desire to secure by Letters Patent, is—

A horseshoe of a convex form, the lower portion of which is of a wedged shape, tapering downwardly and outwardly, and having a level top, the outer edge of which is provided with a rim or bead, extending upwardly and entirely around the shoe, substantially as herein described.

JOHN D. BILLINGS.
MARCUS A. DECKER.

Witnesses:
P. L. VANDERVEER,
GEORGE B. GOODALE.